(12) United States Patent
Ishikawa et al.

(10) Patent No.: US 8,616,355 B2
(45) Date of Patent: Dec. 31, 2013

(54) HYDRAULIC CONTROL DEVICE FOR AUTOMATIC TRANSMISSION

(75) Inventors: Tomomi Ishikawa, Anjo (JP); Tetsuya Shimizu, Anjo (JP); Kazunori Ishikawa, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 602 days.

(21) Appl. No.: 12/871,216

(22) Filed: Aug. 30, 2010

(65) Prior Publication Data

US 2011/0073427 A1    Mar. 31, 2011

(30) Foreign Application Priority Data

Sep. 30, 2009    (JP) ................................ 2009-228737

(51) Int. Cl.
 *F16D 33/00*   (2006.01)
(52) U.S. Cl.
 USPC ...................................................... 192/3.29
(58) Field of Classification Search
 USPC ............ 192/3.29, 3.3, 85.63; 74/732.1, 733.1
 See application file for complete search history.

(56) References Cited

U.S. PATENT DOCUMENTS

| | | | |
|---|---|---|---|
| 6,474,456 B2 * | 11/2002 | Suzuki et al. | 192/3.29 |
| 7,341,133 B2 * | 3/2008 | Ando et al. | 192/3.3 |
| 7,582,042 B2 * | 9/2009 | Sato et al. | 477/158 |
| 7,669,701 B2 * | 3/2010 | Ogata et al. | 192/3.29 |
| 2004/0226795 A1 | 11/2004 | Morise et al. | |

FOREIGN PATENT DOCUMENTS

| | | |
|---|---|---|
| CN | 1550698 A | 12/2004 |
| DE | 10 2004 024 379 A1 | 12/2004 |
| JP | 10-141456 A | 5/1998 |
| JP | 2004-340308 A | 12/2004 |
| JP | 2007-263208 A | 10/2007 |
| JP | 2009-210112 A | 9/2009 |

\* cited by examiner

*Primary Examiner* — David D Le
*Assistant Examiner* — David J Hlavka
(74) *Attorney, Agent, or Firm* — Sughrue Mion, PLLC

(57) ABSTRACT

A hydraulic control device used in an automatic transmission includes an oil pump, a working pressure regulating portion, a first lubricant supply passage, a lockup switch mechanism, and a second lubricant supply passage. The oil pump is driven in accordance with rotation of a driving source. The working pressure regulating portion regulates a working pressure based on an oil pressure generated by the oil pump. The first lubricant supply passage supplies a back pressure of the working pressure to a lubricant passage. The lockup switch mechanism turns on/off a lockup clutch of the automatic transmission by switching a supply/discharge path of the working pressure to/from a fluid transmission apparatus of the automatic transmission. The second lubricant supply passage supplies the working pressure to the lubricant passage and is disconnected when a lockup clutch of the automatic transmission is turned on by the lockup switch mechanism.

8 Claims, 5 Drawing Sheets

FIG.2

|  | C-1 | C-2 | C-3 | B-1 | B-3 | F-2 |
|---|---|---|---|---|---|---|
| 1ST | O |  |  |  | (O) | O |
| 2ND | O |  |  | O |  |  |
| 3RD | O | O |  |  |  |  |
| 4TH |  | O |  | O |  |  |
| REV |  |  | O |  | O |  |

(O) ENGINE BRAKE IN OPERATION

F I G . 4A
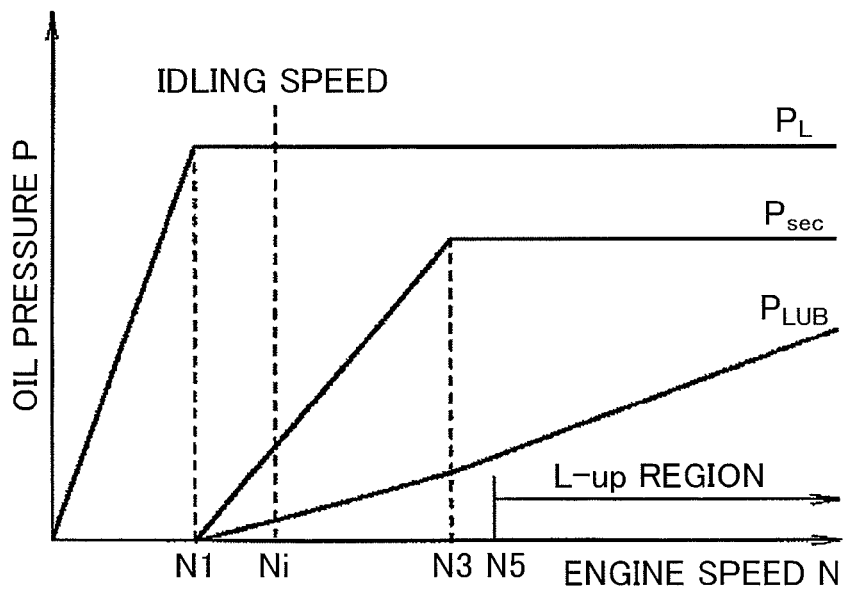
F I G . 4B
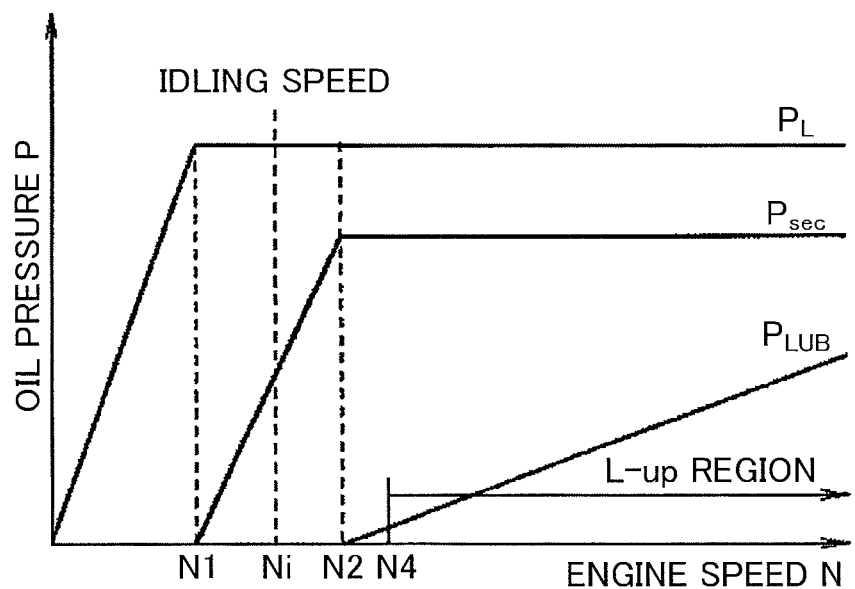

HYDRAULIC CONTROL DEVICE FOR AUTOMATIC TRANSMISSION

INCORPORATION BY REFERENCE

The disclosure of Japanese Patent Application No. 2009-228737 filed on Sep. 30, 2009 including the specification, drawings and abstract is incorporated herein by reference in its entirety.

BACKGROUND OF THE INVENTION

The present invention relates to hydraulic control devices for automatic transmissions that are mounted on, e.g., vehicles. More particularly, the present invention relates to hydraulic control devices for automatic transmissions which include a lockup switch mechanism for turning on/off a lockup clutch capable of locking up a fluid transmission apparatus by switching a supply/discharge path of a working pressure to/from the fluid transmission apparatus, and which supplies an oil pressure to a lubricant passage based on the working pressure.

DESCRIPTION OF THE RELATED ART

Automatic transmissions, which are mounted on, e.g., vehicles, include a fluid transmission apparatus such as a torque converter so that, e.g., the difference between an idling speed of an engine and a rotational speed of driving wheels can be absorbed while the vehicle is stopped, and power can be transmitted when the vehicle is started. In recent years, automatic transmissions have been proposed in which fluid transmission of a fluid transmission apparatus is locked up to reduce a fluid transmission loss, thereby improving fuel efficiency of a vehicle (see Japanese Patent Application Publication No. JP-A-2007-263208).

Automatic transmissions typically include an automatic speed change mechanism for changing the speed of input rotation to transmit the changed speed to driving wheels (e.g., a multi-stage speed change mechanism having a planetary gear, clutches, brakes, and the like, a belt type, toroidal type, or other continuously variable speed change mechanism, or the like). That is, such automatic transmissions are provided with a lubricating circuit (LUBE) for lubricating (carrying a lubricant to) the automatic speed change mechanism. As in Japanese Patent Application Publication No. JP-A-2007-263208, such automatic transmissions typically include a secondary regulator valve that regulates to a secondary pressure a back pressure of a primary regulator valve that regulates a line pressure, and supply a back pressure of the secondary pressure to the lubricating circuit (LUBE).

SUMMARY OF THE INVENTION

As shown in FIG. 5A, if only the back pressure of the secondary pressure is supplied to the lubricating circuit (LUBE) as in Japanese Patent Application Publication No. JP-A-2007-263208, based on an oil pressure generated by an oil pump that operates in accordance with an engine speed N, the oil pressure of the primary regulator valve reaches a normal pressure regulation region for a line pressure $P_L$, and the oil pressure starts to increase to a secondary pressure $P_{SEC}$ using the back pressure of the line pressure $P_L$, at an engine speed N1 lower than an idling speed Ni. However, since the oil pressure of the secondary regulator valve does not reach a normal pressure regulation region for the secondary pressure $P_{SEC}$ (a so-called secondary crack) until the engine speed increases to N2. Namely, driving of a spool of the secondary regulator valve is not started, and no back pressure of the secondary pressure $P_{SEC}$ is generated, until the engine speed increases to N2. Since no back pressure of the secondary pressure $P_{SEC}$ is generated until the engine speed increases to N2 or higher, no lubricant pressure $P_{LUB}$ for the lubricating circuit (LUBE) is generated. This causes a shortage of a lubricant especially when the vehicle is started, which is not preferable in terms of durability of the automatic transmissions.

One possible solution to this problem is to provide a circuit (hereinafter referred to as the "preferential orifice circuit") which communicates with the lubricating circuit (LUBE) by bypassing the secondary pressure $P_{SEC}$ via an orifice having a predetermined diameter. With this structure, as shown in FIG. 5B, the oil pressure reaches the normal driving region for the line pressure $P_L$ and the secondary pressure $P_{SEC}$ starts to increase at the engine speed N1. At the same time, the lubricating pressure $P_{LUB}$ for the lubricating circuit (LUBE) increases through the preferential orifice circuit. Thus, as shown by A in the drawing, a lubricant can be secured even in an engine speed region when the vehicle is started, whereby satisfactory durability of the automatic transmission can be implemented.

However, if the lubricating pressure $P_{LUB}$ for the lubricating circuit (LUBE) is secured via the preferential orifice circuit, the oil pressure of the secondary regulator valve reaches the normal regulation region for the secondary pressure $P_{SEC}$ more slowly. That is, the secondary pressure $P_{SEC}$ is not generated as normally is until the engine speed increases to at least N3 that is higher than N2 (see FIGS. 5A, 5B). Thus, a lockup clutch, which is locked up by the secondary pressure $P_{SEC}$, cannot be locked up until the engine speed increases to N3 or higher. In other words, if the priority orifice circuit is provided to secure a lubricant in a low engine speed region, the lockup clutch is locked up in a higher lockup region. Thus, the lockup operation cannot be performed early, thereby hindering reduction in fuel consumption of the vehicle.

It is an object of the present invention to provide a hydraulic control device for automatic transmissions, which is capable of securing a lubricant even in a low rotational speed region of a driving source when a vehicle is started, and is capable of locking up a lockup clutch even at a lower rotational speed.

According to a first aspect of the present invention, a hydraulic control device is used in an automatic transmission including a fluid transmission apparatus, a lockup clutch capable of locking up the fluid transmission apparatus, and an automatic speed change mechanism changing a speed of rotation transmitted from the fluid transmission apparatus, and transmitting the changed speed to driving wheels, and includes: an oil pump that is driven in accordance with rotation of a driving source; a working pressure regulating portion that regulates a working pressure based on an oil pressure generated by the oil pump; a first lubricant supply passage for supplying a back pressure of the working pressure to a lubricant passage for lubricating the automatic speed change mechanism; and a lockup switch mechanism that turns on/off the lockup clutch by switching a supply/discharge path of the working pressure to/from the fluid transmission apparatus. The hydraulic control device includes: a second lubricant supply passage for supplying the working pressure to the lubricant passage, and the second lubricant supply passage is disconnected when the lockup clutch is turned on by the lockup switch mechanism.

According to a second aspect of the present invention, in the hydraulic control device, the second lubricant supply passage may supply the working pressure to the lubricant passage via an orifice.

More specifically, according to a third aspect of the present invention, in the hydraulic control device, the lockup switch mechanism may include a solenoid valve that switches an output state of a signal pressure, and a lockup switch valve that turns on/off the lockup clutch by switching the supply/discharge path of the working pressure to/from the fluid transmission apparatus based on an input state of the signal pressure, and the lockup switch valve may be provided in the second lubricant supply passage, and cut off the second lubricant supply passage when switched to a position where the lockup clutch is turned on.

More specifically, according to a fourth aspect of the present invention, in the hydraulic control device, the working pressure regulating portion may be formed by a primary regulator valve that regulates a line pressure based on the oil pressure generated by the oil pump, and a secondary regulator valve that regulates a secondary pressure based on a back pressure of the line pressure, the working pressure may be the secondary pressure, and the back pressure of the working pressure may be a back pressure of the secondary pressure.

In the present invention according to the first aspect, the hydraulic control device is structured so that the second lubricant supply passage for supplying the working pressure to the lubricant passage is disconnected when the lockup clutch is turned on by the lockup switch mechanism. Thus, while the lockup clutch is off, the lubricant can be supplied to the lubricant passage via the second lubricant supply passage based on the working pressure. Accordingly, the lubricant for the automatic speed change mechanism can be secured even in a low rotational speed region of the driving source, such as, e.g., when a vehicle is started. At the same time, when the lockup clutch is turned on, the second lubricant supply passage can be disconnected to rapidly increase the working pressure. This enables the lockup clutch to be engaged based on the working pressure even in a lower rotational speed region of the driving source, and thus enables the lockup operation of the lockup clutch to be performed even at a lower rotational speed. Thus, durability can be improved without causing a shortage of the lubricant in a low rotational speed region, and also the lockup operation can be performed even at a lower engine speed, whereby fuel efficiency of the vehicle can be improved.

In the present invention according to the second aspect, since the second lubricant supply passage supplies the working pressure to the lubricant passage via the orifice, an appropriate amount of lubricant based on the working pressure can be supplied to the lubricant passage while the lockup clutch is off.

In the present invention according to the third aspect, the lockup switch valve is provided in the second lubricant supply passage, and cuts off the second lubricant supply passage when switched to the position where the lockup clutch is turned on. This eliminates the need for an additional valve for connecting and disconnecting the second lubricant supply passage in accordance with the on/off state of the lockup clutch, whereby the number of valves can be reduced, and a more compact hydraulic control device can be implemented.

In the present invention according to the fourth aspect, the working pressure is the secondary pressure. Thus, an increase in secondary pressure is delayed with respect to an increase in line pressure in a low rotational speed region of the driving source such as, e.g., when the vehicle is started. However, since the second lubricant supply passage can be disconnected and the secondary pressure can be rapidly increased when the lockup clutch is turned on. This enables the lockup clutch to be engaged based on the secondary pressure even in a lower rotational speed region of the driving source, and thus enables the lockup operation of the lockup clutch to be performed even at a lower engine speed.

BRIEF DESCRIPTION OF THE DRAWINGS

FIG. 2 is an operation table of the automatic transmission;

FIGS. 4A and 4B are graphs showing the relation between an engine speed and an oil pressure, where FIG. 4A shows a lockup off state, and FIG. 4B shows a lockup on state; FIG. 5A shows the case where there is no preferential orifice circuit, and FIG. 5B is a diagram showing the case where there is a preferential orifice circuit.

DETAILED DESCRIPTION OF THE EMBODIMENTS

An embodiment of the present invention will be described with reference to FIGS. 1 to 4A, 4B.

Figure 1:
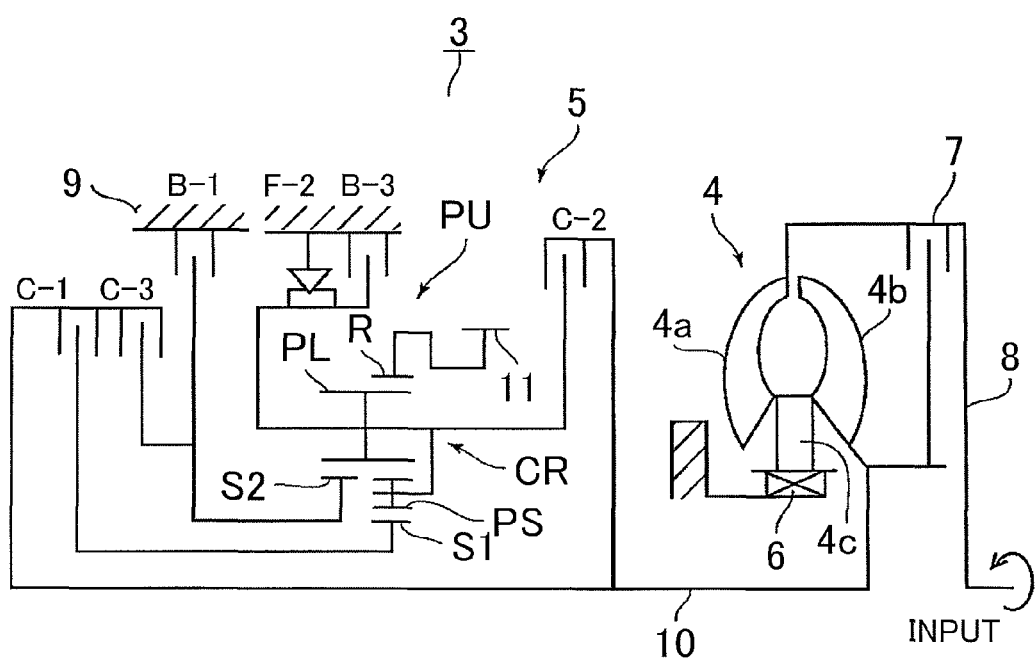
FIG. 1 is a skeleton diagram of an automatic transmission to which the present invention can be applied.

First, the structure of an automatic transmission to which the present invention can be applied will be schematically described with reference to FIG. 1. As shown in FIG. 1, an automatic transmission 3, which is preferably used in, e.g., front engine, front drive (FF) type vehicles, has an input shaft 8 of the automatic transmission 3, which can be connected to an engine. The automatic transmission 3 includes a torque converter (a fluid transmission apparatus) 4 and an automatic speed change mechanism 5, which are positioned about an axial direction of the input shaft 8.

The torque converter 4 has a pump impeller 4a connected to the input shaft 8 of the automatic transmission 3, a turbine runner 4b to which rotation of the pump impeller 4a is transmitted via a working fluid, and a stator 4c interposed between the pump impeller 4a and the turbine runner 4b. Reverse rotation of the stator 4c is restricted by a one-way clutch 6. The turbine runner 4b is connected to an input shaft 10 of the automatic speed change mechanism 5, which is positioned coaxially with the input shaft 8. The torque converter 4 includes a lockup clutch 7. When the lockup clutch 7 is engaged, rotation of the input shaft 8 of the automatic transmission 3 is directly transmitted to the input shaft 10 of the automatic speed change mechanism 5.

The automatic speed change mechanism 5 includes a planetary gear unit PU on the input shaft 10. The planetary gear unit PU is a so-called Ravigneaux type planetary gear, which has a sun gear S1, a sun gear S2, a carrier CR, and a ring gear R as four rotary elements, and has a long pinion PL meshing with the sun gear S2 and the ring gear R, and a short pinion PS meshing with the sun gear S1 on the carrier CR such that the long pinion PL and the short pinion PS mesh with each other.

The sun gear S2 of the planetary gear unit PU is connected to a brake B-1 so that the sun gear S2 can be fixed to a transmission case 9. The sun gear S2 is connected also to a clutch C-3 so that rotation of the input shaft 10 can be applied to the sun gear S2 via the clutch C-3. The sun gear S1 is connected to a clutch C-1 so that rotation of the input shaft 10 can be applied to the sun gear S1.

The carrier CR is connected to a clutch C-2 to which rotation of the input shaft 10 is applied, so that the rotation of the input shaft 10 can be applied to the carrier CR via the clutch C-2. The carrier CR is connected also to a one-way clutch F-2 and a brake B-3, so that rotation of the carrier CR in one direction with respect to the transmission case 9 is restricted via the one-way clutch F-1, and that the carrier CR can be held stationary via the brake B-3. The ring gear R is connected to a counter gear 11. The counter gear 11 is connected to driving wheels through a countershaft and a differential unit, which are not shown.

In the automatic transmission 3 structured as described above, the clutches C-1 to C-3, the brakes B-1, B-2, and the one-way clutch F-2 operate as shown in the operation table of FIG. 2 at forward first to fourth speeds and a reverse speed, thereby establishing a gear ratio of a shift speed at a satisfactory step ratio. Shift control is performed by changing engagement/disengagement states of the clutches C-1 to C-3 and the brakes B-1, B-2, and each shift speed is established by engaging two of the clutches C-1 to C-3 and the brakes B-1, B-2, except at the forward first speed.

Figure 3:
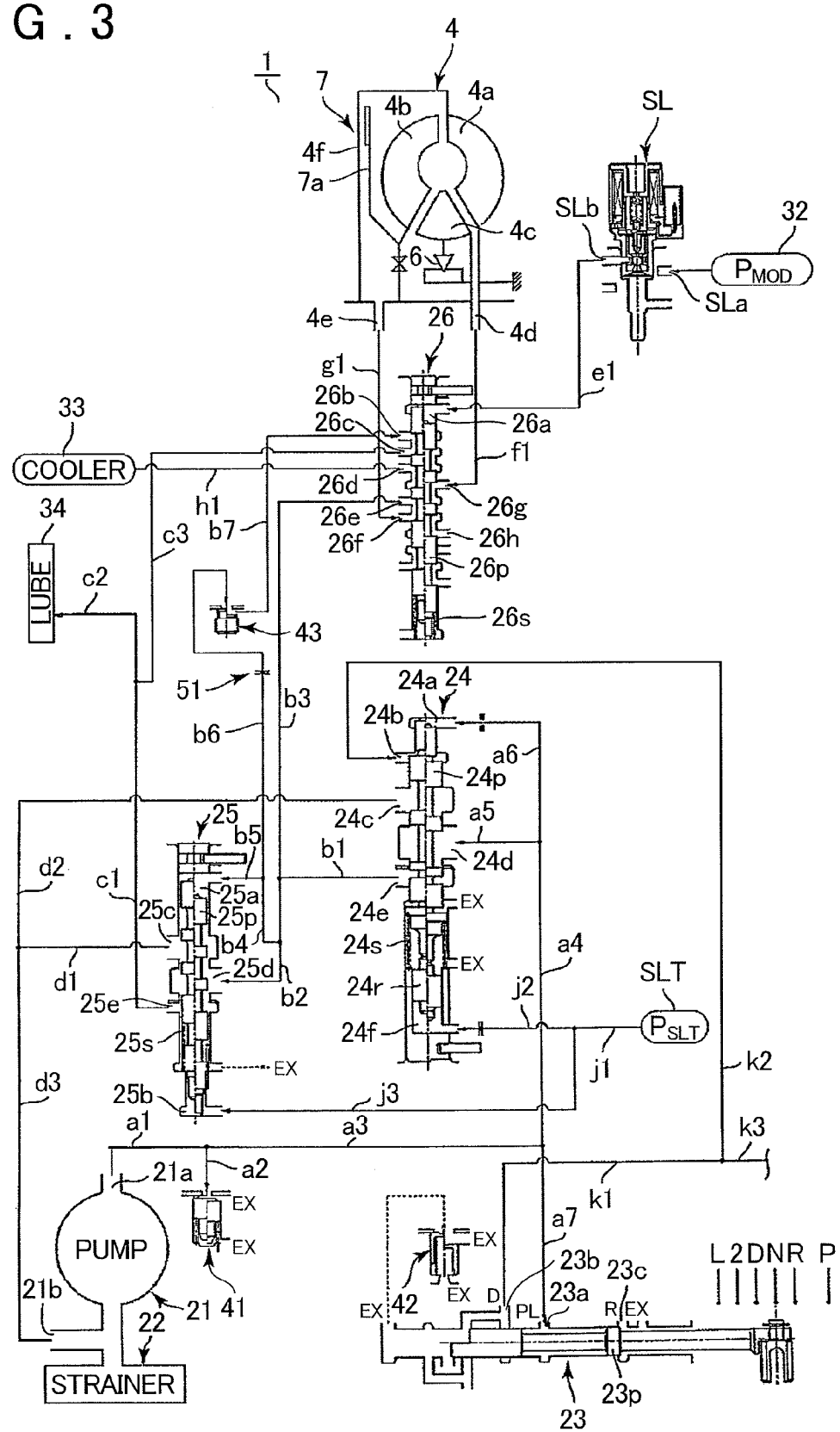
FIG. 3 is a circuit diagram of a hydraulic control device for the automatic transmission according to the present invention.
Figure 5A:
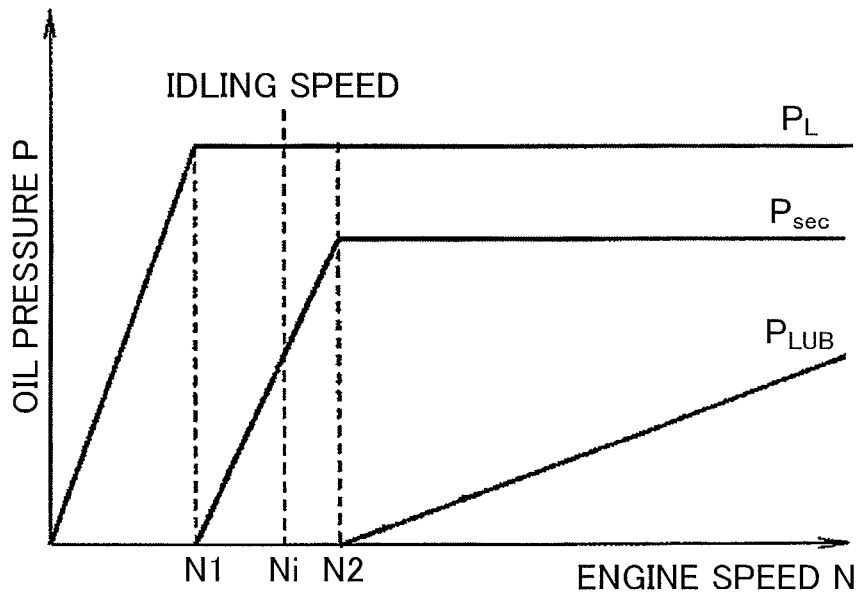
FIGS. 5A and 5B are graphs showing the relation between the engine speed and the oil pressure, where
Figure 5B:
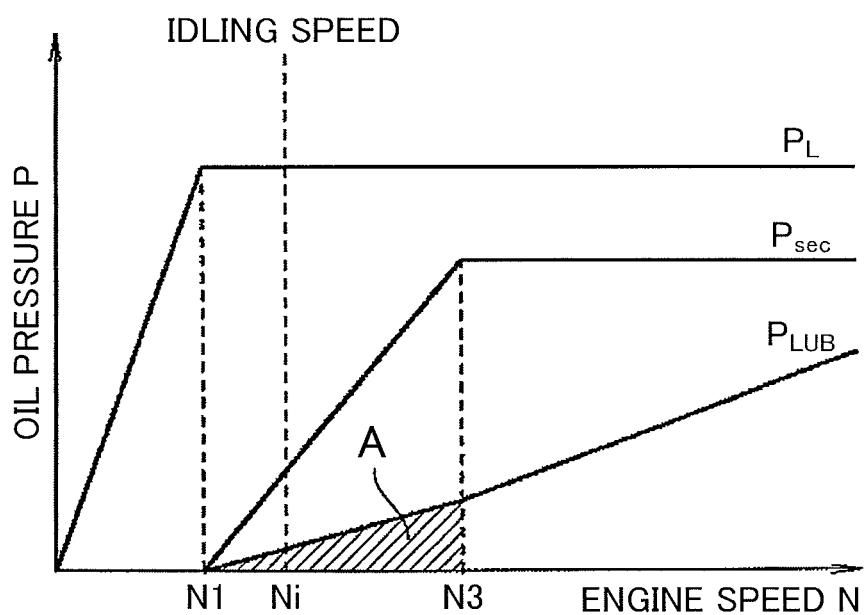

A hydraulic control device 1 for the automatic transmission according to the present invention will be described below. As shown in FIG. 3, the hydraulic control device 1 for the automatic transmission includes a strainer 22, an oil pump 21, a primary regulator valve 24, a secondary regulator valve 25, a manual shift valve 23, a solenoid valve SL, a lockup relay valve 26, an oil cooler (COOLER) 33, a lubricant passage (LUBE) 34, and the like.

Note that the hydraulic control device 1 for the automatic transmission includes various valves, oil passages, and the like for supplying oil pressures to hydraulic servos of the clutches and the brakes of the speed change mechanism described above, in addition to the parts shown in FIG. 3. However, only a main part of the present invention will be described below, and description of other parts will be omitted for convenience of explanation.

Reference character "SLT" in FIG. 3 represents a linear solenoid valve SLT, and indicates that an SLT pressure $P_{SLT}$, which is regulated based on a throttle opening degree or the like, is output from the linear solenoid valve SLT. Reference character 32 in FIG. 3 represents a modulator valve 32, and indicates that a modulator pressure $P_{MOD}$, which is a line pressure $P_L$ regulated to a constant value, is output from the modulator valve 32.

Note that the present embodiment is described with respect to an example in which the SLT pressure $P_{SLT}$ from the linear solenoid valve SLT is used as a pilot pressure (an adjustment pressure) of the primary regulator valve 24 described later. However, the present invention is not limited to this, and as disclosed in Japanese Patent Application Publication No. JP-A-2007-271058, the largest one of oil pressures required in each part may be fed back as the pilot pressure (the adjustment pressure).

As shown in FIG. 3, the hydraulic control device 1 for the automatic transmission includes the oil pump 21 that is driven according to rotation of the engine, not shown. The hydraulic control device 1 generates an oil pressure by sucking oil from an oil pan, not shown, by the oil pump 21 through the strainer 22. The oil pressure generated by the oil pump 21 is output to oil passages a1, a2, a3, a4, a5, a6, and a7 from an output port 21a, and is regulated to the line pressure $P_L$ by the primary regulator valve 24. The line pressure $P_L$ and the primary regulator valve 24 will be described in detail later.

The manual shift valve 23 includes: a spool 23p that is driven according to a shift lever, not shown; an input port 23a for receiving the line pressure $P_L$ described later; a forward range pressure output port 23b for outputting the line pressure $P_L$ as a forward range pressure $P_D$ when the spool 23p is driven to a position of a forward range (D range, 2 range, or L range); and a reverse range pressure output port 23c for outputting the line pressure $P_L$ as a reverse range pressure $P_R$ when the spool 23p is driven to a position of a reverse range (R range). For example, the reverse range pressure $P_R$, which is output from the reverse range pressure output port 23c in the R range, is supplied as a source pressure to hydraulic servos of the clutch C-3 and the brake B-3 through oil passages not shown in FIG. 3, whereby the reverse speed is established (see FIG. 2). For example, the forward range pressure $P_D$, which is output from the forward range pressure output port 23b in the D range, is output to an oil chamber 24b of the primary regulator valve 24 described later, via oil passages k1, k2. Moreover, this forward range pressure $P_D$ is supplied as a source pressure to each linear solenoid valve, not shown, via oil passages extending continuously with an oil passage k3, which are not shown in FIG. 3, and is finally supplied to hydraulic servos of the clutch C-1, the clutch C-2, and the brake B-1, whereby the forward first to fourth speeds are established (see FIG. 2).

Note that a check valve 42 is structured so as to be closed when the forward range pressure $P_D$, which is discharged from a drain port EX of the manual shift valve 23, becomes equal to a predetermined value or less when in a neutral range (N range) or a parking range (P range). The check valve 42 prevents air from entering the manual shift valve 23, the oil passages k1, k2, k3, and the like.

The primary regulator valve (a working pressure regulating portion) 24 includes a spool 24p, a spring 24s for biasing the spool 24p upward in the drawing, and a plug 24r. The primary regulator valve 24 further includes an oil chamber 24a located above the spool 24p, an oil chamber 24f located under the plug 24r, the oil chamber 24b formed by the difference in land diameter of the spool 24p, a discharge port 24c, a pressure regulating port 24d, and a back pressure output port 24e. The SLT pressure $P_{SLT}$ is applied from the linear solenoid valve SLT to the oil chamber 24f via oil passages j1, j2. The line pressure $P_L$, described in detail later, is applied to the oil chamber 24a via the oil passages a5, a6 as a feedback pressure. As described above, in the forward range, the forward range pressure $P_D$ is applied to the oil chamber 24b via the oil passages k1, k2.

The spool 24p and the plug 24r of the primary regulator valve 24 are subjected to a biasing force of the spring 24s and the SLT pressure $P_{SLT}$ against the feedback pressure. That is, the position of the spool 24p is controlled mainly by the magnitude of the SLT pressure $P_{SLT}$. When the spool 24p is located on the lower side in the drawing, the pressure regulating port 24d and the discharge port 24c communicate with each other. As the spool 24p is moved to the upper side in the drawing based on the SLT pressure $P_{SLT}$, the amount of communication (the throttle amount) between the pressure regulating port 24d and the discharge port 24c is reduced (the pressure regulating port 24d and the discharge port 24c are disconnected from each other) accordingly, while the amount of communication (the throttle amount) between the pressure regulating port 24d and the back pressure output port 24e is increased accordingly. That is, the spool 24p is moved upward according to the magnitude of the SLT pressure $P_{SLT}$ that is applied to the oil chamber 24f, and the amount of oil pressure that is discharged from the discharge port 24c is adjusted, whereby an oil pressure of the pressure regulating port 24d is regulated. Thus, an oil pressure of the oil passages a1, a2, a3, a4, a5, a6, a7 are regulated as the line pressure $P_L$ according to the throttle opening degree.

Note that as the oil pump 21 increases an oil pressure with an increase in engine speed, and the line pressure $P_L$ increases accordingly, the feedback pressure of the oil chamber 24a overcomes the biasing force of the spring 24s, and the pressure regulating port 24d and the back pressure output port 24e start to communicate with each other (a primary crack) (at an engine speed N1 in FIGS. 4A, 4B), namely the oil pressure reaches a normal pressure regulation region for regulating the oil pressure to the line pressure $P_L$ (at the engine speed N1 or higher in FIGS. 4A, 4B). In this case, the back pressure of the line pressure $P_L$ is output from the back pressure output port 24e, and a secondary pressure $P_{SEC}$, described later, starts to increase.

If the forward range pressure $P_D$ is applied to the oil chamber 24b in the forward range, the spool 24p is biased downward, and a gain (an input/output ratio) of the line pressure $P_L$ with respect to the SLT pressure $P_{SLT}$ is reduced. That is, during reverse traveling, since large torque capacity is required for the clutch C-3 and the brake B-3, the gain of the line pressure $P_L$ with respect to the SLT pressure $P_{SLT}$ needs to be increased. During forward traveling, however, such line pressure $P_L$ that secures sufficient torque capacity as an oil pressure that is supplied to the hydraulic servos of the clutches C-1, C-2 and the brake B-1 can be obtained even if the gain of the line pressure $P_L$ with respect to the SLT pressure $P_{SLT}$ is reduced. That is, the line pressure $P_L$ that is output according to the throttle opening is suppressed to a low value. Thus, an excessive increase in line pressure $P_L$ is suppressed, whereby fuel consumption of the vehicle can be reduced.

The oil pressure discharged from the discharge port 24c is returned to a port 21b of the oil pump 21 via oil passages d2, d3, and serves as a source pressure of the oil pump 21, thereby reducing a driving force required for the oil pump 21. This can prevent excessive energy consumption, and can contribute to reduction in fuel consumption of the vehicle including the hydraulic control device 1 for the automatic transmission.

Note that the line pressure $P_L$ is supplied also to the modulator valve 32 via an oil passage, not shown. If the line pressure $P_L$ is less than a predetermined value, the modulator valve 32 outputs the line pressure $P_L$ as it is as the modulator pressure $P_{MOD}$. If the line pressure $P_L$ is equal to or higher than the predetermined value, the modulator valve 32 outputs the line pressure $P_L$ regulated to a constant value, as the modulator pressure $P_{MOD}$. A check valve 41, which is connected to the oil pump 21 via the oil passage a2, is a valve that is opened when the line pressure $P_L$ increases excessively. If the line pressure $P_L$ becomes equal to or higher than the predetermined valve, the check valve 41 drains the line pressure $P_L$ to protect the hydraulic control device 1.

The secondary regulator valve (a working pressure regulating portion) 25 includes a spool 25p, and a spring 25s for biasing the spool 25p upward in the drawing. The secondary regulator valve 25 further includes an oil chamber 25a located above the spool 25p, an oil chamber 25b located under the spool 25p, a discharge port 25c, a pressure regulating port 25d, and a back pressure output port 25e. The SLT pressure $P_{SLT}$ is applied from the linear solenoid valve SLT to the oil chamber 25b via oil passages j1, j3. The secondary pressure $P_{SEC}$, described in detail later, is applied to the oil chamber 25a via oil passages b2, b4, b5 as a feedback pressure.

The spool 25p of the secondary regulator valve 25 is subjected to a biasing force of the spring 25s and the SLT pressure $P_{SLT}$ against the feedback pressure. That is, the position of the spool 25p is controlled mainly by the magnitude of the SLT pressure $P_{SLT}$. When the spool 25p is located on the lower side in the drawing, the pressure regulating port 25d and the discharge port 25c communicate with each other. As the spool 25p is moved to the upper side in the drawing based on the SLT pressure $P_{SLT}$, the amount of communication (the throttle amount) between the pressure regulating port 25d and the discharge port 25c is reduced (the pressure regulating port 25d and the discharge port 25c are disconnected from each other) accordingly, while the amount of communication (the throttle amount) between the pressure regulating port 25d and the back pressure output port 25e is increased accordingly. That is, the spool 25p is moved upward according to the magnitude of the SLT pressure $P_{SLT}$ that is applied to the oil chamber 25f, and the amount of oil pressure that is discharged from the discharge port 25c is adjusted, whereby an oil pressure of the pressure regulating port 25d is regulated. Thus, an oil pressure of oil passages b1, b2, b3, b4, b5, b6, b7 are regulated as the secondary pressure $P_{SEC}$ according to the throttle opening degree.

Note that as the oil pump 21 generates an oil pressure according to the engine speed, and the oil pressure reaches the normal pressure regulation region for regulating the oil pressure to the line pressure $P_L$, the back pressure of the line pressure $P_L$ is output from the primary regulator valve 24. As the back pressure of the line pressure $P_L$ increases, the feedback pressure of the oil chamber 25a of the secondary regulator valve 25 overcomes the biasing force of the spring 25s, and the pressure regulating port 25d and the back pressure output port 25e start to communicate with each other (a secondary crack), namely the oil pressure reaches a normal pressure regulation region for regulating the oil pressure to the secondary pressure $P_{SEC}$. In this case, the back pressure of the secondary pressure $P_{SEC}$ is output via oil passages c1, c2 (a first lubricant supply passage) to the lubricant passage (LUBE) 34 that communicates with the automatic speed change mechanism 5. That is, the back pressure of the secondary pressure $P_{SEC}$ serves as a lubrication pressure of the lubricant.

As in the primary regulator valve 24, the oil pressure discharged from the discharge port 25c is returned to the port 21b of the oil pump 21 via oil passages d1, d3, and serves as a source pressure of the oil pump 21, thereby reducing a driving force required for the oil pump 21. This can prevent excessive energy consumption, and can contribute to reduction in fuel consumption of the vehicle including the hydraulic control device 1 for the automatic transmission.

The solenoid valve (a lockup switch mechanism) SL (e.g., a normally closed solenoid valve) has an input port SLa and an output port SLb. The modulator pressure $P_{MOL}$, regulated by the modulator valve 32, is applied to the input port SLa. When the solenoid valve SL is off (in a non-energized state), the input port SLa and the output port SLb are disconnected from each other. When the solenoid valve SL is turned on (in an energized state) based on a signal from a control unit (ECU), not shown, the input port SLa and the output port SLb communicate with each other, and the modulator pressure $P_{MOL}$ applied to the input port SLa is output substantially as it is from the output port SLb as a signal pressure $P_{SL}$. That is, the solenoid valve SL switches the output state of the signal pressure $P_{SL}$ based on the signal from the control unit (ECU), not shown. The signal pressure $P_{SL}$ output from the output port SLb is applied to an oil chamber 26a of a lockup relay valve 26, which will be described later, via an oil passage e1.

Note that although the solenoid valve SL is a so-called normally closed solenoid valve in which the input port SLa and the output port SLb are disconnected from each other in the non-energized state, the solenoid valve SL may a so-called normally open solenoid valve in which the input port SLa and the output port SLb communicate with each other in the non-energized state. In this case, the solenoid valve SL outputs no signal pressure $P_{S1}$ in the energized state.

The lockup relay valve (a lockup switch mechanism, a lockup switch valve) 26 includes a spool 26p, and a spring 26s for biasing the spool 26p upward in the drawing. The lockup relay valve 26 further includes, above the spool 26p, the oil chamber 26a, an input port 26b, a port 26c, an output port 26d, an input port 26e, a port 26f, a port 26g, and a discharge port 26h.

The output port SLa of the solenoid valve SL is connected to the oil chamber 26a via the oil passage e1. The signal pressure $P_{SL}$, which is output from the solenoid valve SL, is applied to the oil chamber 26a. In the lockup relay valve 26, the spool 26p is located at a position shown in the left half of the lockup relay valve 26 in the drawing (hereinafter referred to as the "left-half position") when no signal pressure $P_{SL}$ is output from the solenoid valve SL. In the lockup relay valve 26, the spool 26p is located at a position shown in the right half of the lockup relay valve 26 in the drawing (hereinafter referred to as the "right-half position") when the signal output $P_{SL}$ is output from the solenoid valve SL. That is, the lockup relay valve 26 is switched based on the input state of the signal pressure $P_{SL}$.

When the spool 26p of the lockup relay valve 26 is located at the left-half position, the input port 26b and the port 26c communicate with each other, the port 26g and the output port 26d communicate with each other, and the input port 26e and the port 26f communicate with each other. When the spool 26p is located at the right-half position, the port 26c and the output port 26d communicate with each other, the input port 26e and the port 26g communicate with each other, and the port 26f and the discharge port 26h communicate with each other, whereas the input port 26b is blocked by the spool 26p.

When the solenoid valve SL is off based on, e.g., a command from the control unit (ECU), not shown, no oil pressure is applied to the oil chamber 26a, and the spool 26p is located at the left-half position based on a biasing force of the spring 26s. In this case, the secondary pressure $P_{SEC}$, which is applied to the input port 26e via the oil passages b2, b3, is output from the port 26f, and is supplied to a port (an L-UP·OFF port) 4e of the torque converter 4 via an oil passage g1. That is, the secondary pressure $P_{SEC}$ is supplied into the torque converter 4. The oil supplied to the torque converter 4 is discharged from a port (an L-UP·ON port) 4d, and is applied to the port 26g of the lockup relay valve 26 via an oil passage f1. This oil is output from the port 26b, and is supplied to the oil cooler (COOLER) 33 via an oil passage h1. Note that after the oil is cooled by the oil cooler 33, the cooled oil is discharged into the oil pan, not shown, and is sucked again by the oil pump 21 via the strainer 22.

In the state where the secondary pressure $P_{SEC}$ is applied to the port 4e of the torque converter 4 and is discharged from the port 4d thereof, a piston 7a of the lockup clutch 7 is separated from a front cover 4f. That is, the lockup clutch 7 is disengaged into an off state.

When the spool 26p of the lockup relay valve 26 is located at the left-half position, namely when the lockup clutch 7 is off, the secondary pressure $P_{SEC}$, which is applied to the input port 26b via the oil passages b2, b4, b6, an orifice 51, a check valve 43, and the oil passage b7, is supplied from the port 26c to the lubricant passage 34 via oil passages c3, c2. Note that the check valve 43, which is located between the oil passages b6, b7, is provided as a check valve for preventing the back pressure of the secondary pressure $P_{SEC}$ from flowing back to the oil passage b6 via the oil passages c1, c3, b7. In the present embodiment, the oil passages b2, b4, b6, b7, c3, c2, which guide the secondary pressure $P_{SEC}$ to the lubricant passage 34 via the orifice 51, are referred to as a "preferential orifice oil passage (a second lubricant supply passage)."

On the other hand, when the solenoid valve SL is turned on based on, e.g., a command of the control unit (ECU), not shown, the signal pressure $P_{SL}$ is applied to the oil chamber 26a of the lockup relay valve 26, and the spool 26p is switched to the right-half position against the biasing force of the spring 26s. In this case, the secondary pressure $P_{SEC}$, applied to the input port 26e via the oil passages b2, b3, is output from the port 26g, and is supplied to the port 4d of the torque converter 4 via the oil passage f1. That is, the secondary pressure $P_{SEC}$ is supplied to the torque converter 4. The port 4e of the torque converter 4 communicates with the discharge port 26h via the oil passage g1 and the port 26f. That is, the secondary pressure $P_{SEC}$ is discharged from the port 4e. Thus, if the secondary pressure $P_{SEC}$ is discharged from the port 4e, the oil pressure in the space between the piston 7a of the lockup clutch 7 and the front cover 4f is reduced, and the piston 7a is driven to be pressed toward the front cover 4f based on the difference between the reduced oil pressure and the secondary pressure $P_{SEC}$ in the torque converter 4. That is, the lockup clutch 7 is engaged and placed in an on state.

Note that the present embodiment is described with respect to an example in which on/off control of the lockup clutch 7 is performed. However, slip control of the lockup clutch 7 may be performed by, e.g., providing the discharge port 26h with a lockup control valve for controlling discharge of the secondary pressure $P_{SEC}$, and regulating the secondary pressure $P_{SEC}$, which is discharged via the control valve, by a linear solenoid valve SLU or the like. In this case, the solenoid valve SL may be replaced with the linear solenoid valve SLU. That is, the present invention may be structured so that the on/off and slip control of the lockup clutch 7 can be performed only by the single linear solenoid valve SLU.

When the spool 26p of the lockup relay valve 26 is switched to the right-half position so that the lockup clutch 7 is turned on, the input port 26b and the port 26c are disconnected from each other. That is, the oil passages b7, c3 in the preferential orifice passage are disconnected from each other. This prevents the secondary pressure $P_{SEC}$ from being supplied from the preferential orifice passage to the lubricant passage 34. That is, the hydraulic control device is equivalent to a hydraulic control device having no preferential orifice passage. Thus, the secondary pressure $P_{SEC}$ rises immediately, and the feedback pressure of the secondary pressure $P_{SEC}$ overcomes the biasing force of the spring 25s, whereby the oil pressure immediately reaches the normal pressure regulation region (the secondary crack).

More specifically, as shown in FIG. 4A, in a lockup off state, part of the secondary pressure $P_{SEC}$ is supplied to the lubricant passage 34 via the preferential orifice oil passage b2, b4, b6, b7, c3, c2, and thus a lubricating pressure $P_{LUB}$ is supplied to the lubricant passage 34 even in the range from the engine speed N1 at which the oil pressure of the primary regulator valve 24 reaches the normal pressure regulation region (the primary crack), to the engine speed N3 at which the oil pressure of the secondary regulator valve 25 reaches the normal pressure regulation region (the secondary crack). As shown in FIG. 4B, in a lockup on state, the oil passages b7, c3 in the preferential orifice oil passage are disconnected from each other. Thus, part of the secondary pressure $P_{SEC}$ is not supplied as the lubricating pressure $P_{LUB}$, and the oil pressure of the secondary regulator valve 25 reaches the normal pressure regulation region (the secondary crack) at the engine speed N2 lower than the engine speed N3.

Namely, when the preferential orifice oil passage is not disconnected, as shown in FIG. 4A, a lockup region where the lockup clutch 7 can be engaged is at the engine speed N5 or higher. However, in the present invention, the lockup relay valve 26 cuts off the preferential orifice oil passage in the lockup on state. As shown in FIG. 4B, this enables the lockup clutch 7 to be locked up in a lockup region of an engine speed N4 or higher. That is, the lockup operation of the lockup clutch 7 can be performed at a lower engine speed.

Note that when the spool 26p of the lockup relay valve 26 is switched to the right-half position so that the lockup clutch 7 is turned on, the back pressure of the secondary pressure $P_{SEC}$ is applied to the port 26c via the oil passages c1, c3, and is supplied from the output port 26d to the oil cooler 33 via the oil passage h1.

As described above, the hydraulic control device 1 for the automatic transmission of the present invention is structured so that the preferential orifice oil passage b2, b4, b6, b7, c3, c2 for supplying the secondary pressure $P_{SEC}$ to the lubricant passage 34 is disconnected when the lockup clutch 7 is turned on. Thus, while the lockup clutch 7 is off, the lubricant can be supplied to the lubricant passage 34 via the preferential orifice oil passage based on the secondary pressure $P_{SEC}$. Accordingly, the lubricant for the automatic speed change mechanism 5 can be secured even in a low engine speed region, such as, e.g., when the vehicle is started. At the same time, when the lockup clutch 7 is turned on, the preferential orifice oil passage can be disconnected to rapidly increase the secondary pressure $P_{SEC}$. This enables the lockup clutch 7 to be engaged based on the secondary pressure $P_{SEC}$ even in a lower engine speed region, and thus enables the lockup operation of the lockup clutch 7 to be performed even at a lower engine speed. Thus, durability can be improved without causing a shortage of the lubricant in a low engine speed region, and also the lockup operation can be performed even at a lower engine speed, whereby fuel consumption of the vehicle can be reduced.

Since the preferential orifice oil passage b2, b4, b6, b7, c3, c2 supplies the secondary pressure $P_{SEC}$ to the lubricant passage 34 via the orifice 51, an appropriate amount of lubricant based on the secondary pressure $P_{SEC}$ can be supplied to the lubricant passage 34 while the lockup clutch 7 is off.

The lockup relay valve 26 is provided in the preferential orifice oil passage, and cuts off the preferential orifice oil passage when the spool 26p is switched to the position where the lockup clutch 7 is turned on. This eliminates the need for an additional valve for connecting and disconnecting the preferential orifice oil passage according to the on/off state of the lockup clutch 7, whereby the number of valves can be reduced, and a more compact hydraulic control device can be implemented.

The working pressure of the lockup clutch 7 is the secondary pressure $P_{SEC}$. Thus, in a low engine speed region such as, e.g., when the vehicle is started, an increase in secondary pressure $P_{SEC}$ is delayed with respect to an increase in line pressure $P_L$. However, since the preferential orifice oil passage can be disconnected and the secondary pressure $P_{SEC}$ can be rapidly increased when the lockup clutch 7 is turned on. This enables the lockup clutch 7 to be engaged based on the secondary pressure $P_{SEC}$ even in a lower engine speed region, and thus enables the lockup operation of the lockup clutch 7 to be performed even at a lower engine speed.

Note that the fluid transmission apparatus having two ports 4d, 4e (a so-called two-way type) to turn on/off the lockup clutch 7 by the difference in pressure between the ports is described as an example in the present embodiment. However, the present invention is not limited to this, and the fluid transmission apparatus may be, e.g., a torque converter having three ports (a so-called three-way type), or a fluid coupling or the like. That is, the fluid transmission apparatus may be any apparatus as long as it turns on/off the lockup clutch by switching a supply/discharge path of the working pressure to/from the fluid transmission apparatus.

The present embodiment is described with respect to an example in which an internal combustion engine is used as a driving source. However, it is to be understood that the hydraulic control device for the automatic transmission of the present invention may also be applied to, e.g., a hybrid vehicle having a motor-generator.

The present embodiment is described above with respect to an example in which the secondary pressure $P_{SEC}$ is used as the working pressure of the lockup clutch 7 (the torque converter 4). However, the line pressure $P_L$ may be used as the working pressure of the lockup clutch 7 (the torque converter 4). In this case, the secondary regulator valve is omitted, and the hydraulic control device includes only the primary regulator valve.

The hydraulic control device for the automatic transmission according to the present invention can be used as hydraulic control devices for automatic transmissions that are mounted on passenger cars, trucks, and the like, and is especially preferable when used in automatic transmissions which are required to secure lubricant for an automatic speed change mechanism in a low rotational speed region of a driving source, and is required to be able to lock up a lockup clutch even at a lower rotational speed.

What is claimed is:

1. A hydraulic control device for use in an automatic transmission including a fluid transmission apparatus, a lockup clutch capable of locking up the fluid transmission apparatus, and an automatic speed change mechanism changing a speed of rotation transmitted from the fluid transmission apparatus and transmitting the changed speed to driving wheels, wherein the hydraulic control device comprises:
   an oil pump that is driven in accordance with rotation of a driving source;
   a working pressure regulating portion that regulates a working pressure based on an oil pressure generated by the oil pump;
   a first lubricant supply passage for supplying a back pressure of the working pressure to a lubricant passage for lubricating the automatic speed change mechanism; and
   a lockup switch mechanism that turns on/off the lockup clutch by switching a supply/discharge path of the working pressure to/from the fluid transmission apparatus, the hydraulic control device comprising:
   a second lubricant supply passage, which is different from the first lubricant supply passage, for supplying the working pressure to the lubricant passage, wherein
   the second lubricant supply passage includes a first oil passage for supplying the working pressure to the lockup switch mechanism and a second oil pressure for supplying the working pressure, which is supplied to the lockup switch mechanism from the first oil passage, to the lubricant passage from the lockup switch mechanism,
   the first oil passage and the second oil passage are disconnected from each other when the lockup clutch is turned on by the lockup switch mechanism.

2. The hydraulic control device according to claim 1, wherein
   the second lubricant supply passage supplies the working pressure to the lubricant passage via an orifice.

3. The hydraulic control device according to claim 2, wherein the lockup switch mechanism includes a solenoid valve that switches an output state of a signal pressure, and a lockup switch valve that turns on/off the lockup clutch by switching the supply/discharge path of the working pressure to/from the fluid transmission apparatus based on an input state of the signal pressure, and the lockup switch valve is provided in the second lubricant supply passage, and cuts off the second lubricant supply passage when switched to a position where the lockup clutch is turned on.

4. The hydraulic control device according to claim 3, wherein the working pressure regulating portion is formed by a primary regulator valve that regulates a line pressure based on the oil pressure generated by the oil pump, and a secondary regulator valve that regulates a secondary pressure based on a back pressure of the line pressure, the working pressure is the secondary pressure, and the back pressure of the working pressure is a back pressure of the secondary pressure.

5. The hydraulic control device according to claim 2, wherein the working pressure regulating portion is formed by a primary regulator valve that regulates a line pressure based on the oil pressure generated by the oil pump, and a secondary regulator valve that regulates a secondary pressure based on a back pressure of the line pressure, the working pressure is the secondary pressure, and the back pressure of the working pressure is a back pressure of the secondary pressure.

6. The hydraulic control device according to claim 1, wherein the lockup switch mechanism includes a solenoid valve that switches an output state of a signal pressure, and a lockup switch valve that turns on/off the lockup clutch by switching the supply/discharge path of the working pressure to/from the fluid transmission apparatus based on an input state of the signal pressure, and the lockup switch valve is provided in the second lubricant supply passage, and cuts off the second lubricant supply passage when switched to a position where the lockup clutch is turned on.

7. The hydraulic control device according to claim 6, wherein the working pressure regulating portion is formed by a primary regulator valve that regulates a line pressure based on the oil pressure generated by the oil pump, and a secondary regulator valve that regulates a secondary pressure based on a back pressure of the line pressure, the working pressure is the secondary pressure, and the back pressure of the working pressure is a back pressure of the secondary pressure.

8. The hydraulic control device according to claim 1, wherein the working pressure regulating portion is formed by a primary regulator valve that regulates a line pressure based on the oil pressure generated by the oil pump, and a secondary regulator valve that regulates a secondary pressure based on a back pressure of the line pressure, the working pressure is the secondary pressure, and the back pressure of the working pressure is a back pressure of the secondary pressure.

\* \* \* \* \*